US008208172B2

(12) United States Patent
Takayama et al.

(10) Patent No.: US 8,208,172 B2
(45) Date of Patent: Jun. 26, 2012

(54) IMAGE FORMING APPARATUS AND IMAGE FORMING METHOD

(75) Inventors: Yuuji Takayama, Suntou-gun (JP); Hisashi Ishikawa, Urayasu (JP); Tomoyuki Saiki, Suntou-gun (JP); Go Araki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 12/638,524

(22) Filed: Dec. 15, 2009

(65) Prior Publication Data
US 2010/0171970 A1 Jul. 8, 2010

(30) Foreign Application Priority Data

Jan. 6, 2009 (JP) ................................ 2009-001105

(51) Int. Cl.
*H04N 1/60* (2006.01)
(52) U.S. Cl. .......... 358/1.9; 358/2.1; 358/3.2; 358/3.01; 358/3.03; 382/252
(58) Field of Classification Search ............ 358/2.1, 358/3.01, 3.03, 3.06–3.2, 3.26–3.27, 534–536; 382/252, 254–269
See application file for complete search history.

(56) References Cited

U.S. PATENT DOCUMENTS

| 5,115,241 | A | 5/1992 | Ishikawa | 341/143 |
|---|---|---|---|---|
| 5,436,981 | A | 7/1995 | Ishikawa | 382/173 |
| 6,084,984 | A | 7/2000 | Ishikawa | 382/173 |
| 7,002,622 | B2 * | 2/2006 | Tanaka et al. | 348/222.1 |
| 7,164,502 | B2 * | 1/2007 | Nose et al. | 358/3.03 |
| 7,203,376 | B2 * | 4/2007 | Takahashi et al. | 382/252 |
| 7,295,701 | B2 | 11/2007 | Suzuki et al. | 382/162 |
| 7,359,091 | B2 * | 4/2008 | Curry | 358/3.06 |
| 7,432,985 | B2 * | 10/2008 | Ishikawa et al. | 348/616 |
| 7,564,588 | B2 * | 7/2009 | Ogawa et al. | 358/3.03 |
| 7,936,479 | B2 * | 5/2011 | Bracke et al. | 358/3.03 |
| 2003/0038952 | A1 * | 2/2003 | Matsukubo et al. | 358/1.2 |
| 2003/0169455 | A1 * | 9/2003 | Takahashi et al. | 358/3.03 |
| 2004/0085557 | A1 * | 5/2004 | Loce et al. | 358/1.9 |
| 2005/0025374 | A1 * | 2/2005 | Ishikawa | 382/252 |
| 2005/0062995 | A1 * | 3/2005 | Loce et al. | 358/1.9 |
| 2006/0228035 | A1 | 10/2006 | Ishikawa | 382/252 |
| 2008/0186541 | A1 | 8/2008 | Takasaka et al. | 358/1.16 |
| 2008/0266581 | A1 * | 10/2008 | Ishikawa et al. | 358/1.2 |

(Continued)

FOREIGN PATENT DOCUMENTS
JP 9-74488 3/1997
(Continued)

*Primary Examiner* — King Poon
*Assistant Examiner* — Ted Barnes
(74) *Attorney, Agent, or Firm* — Fitzpatrick, Cella, Harper & Scinto

(57) ABSTRACT

An image forming apparatus includes a resolution conversion unit that integrates n pixels that are contiguous in the sub-scanning direction, and that determines an average value of pixel values of the n pixels as a pixel value of integrated pixels, a quantization unit that quantizes the pixel value of the integrated pixels to N levels, an image analysis unit that performs first determination processing for determining whether the difference between the pixel values of the n input pixels exceeds a threshold value set in advance, and second determination processing for determining whether a direction in which the pixel values of the n input pixels becomes greater is a forward direction of the sub-scanning direction or an opposite direction, and a pixel selection unit that determines n output pixels, based on the results, from a quantization result of the integrated pixels.

8 Claims, 13 Drawing Sheets

U.S. PATENT DOCUMENTS

| | | | |
|---|---|---|---|
| 2009/0027404 A1 | 1/2009 | Hara et al. | 345/506 |
| 2009/0034861 A1 | 2/2009 | Nakagawa et al. | 382/254 |
| 2009/0060390 A1 | 3/2009 | Hara et al. | 382/303 |
| 2009/0073495 A1* | 3/2009 | Ogawa | 358/3.01 |
| 2009/0097057 A1 | 4/2009 | Hosaki et al. | 358/1.15 |
| 2009/0097550 A1* | 4/2009 | Nozawa | 375/240.03 |
| 2009/0161954 A1 | 6/2009 | Inoue et al. | 382/173 |
| 2010/0103464 A1* | 4/2010 | Takayama et al. | 358/2.1 |
| 2010/0103469 A1* | 4/2010 | Araki et al. | 358/3.26 |

FOREIGN PATENT DOCUMENTS

JP    2001-309188    11/2001

* cited by examiner

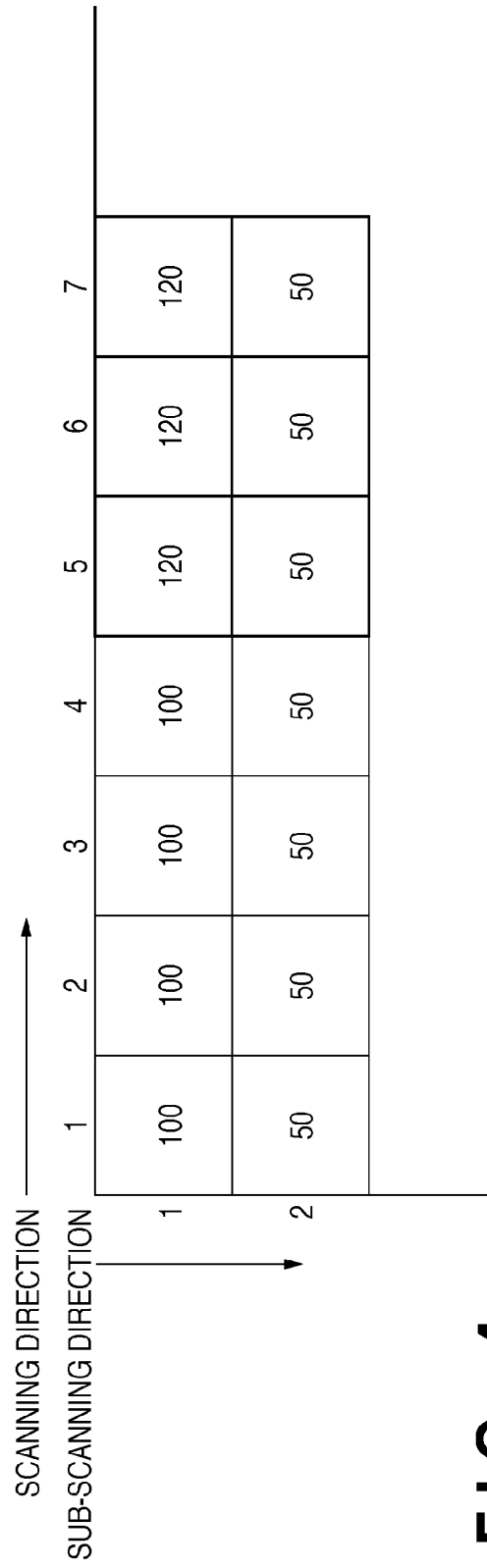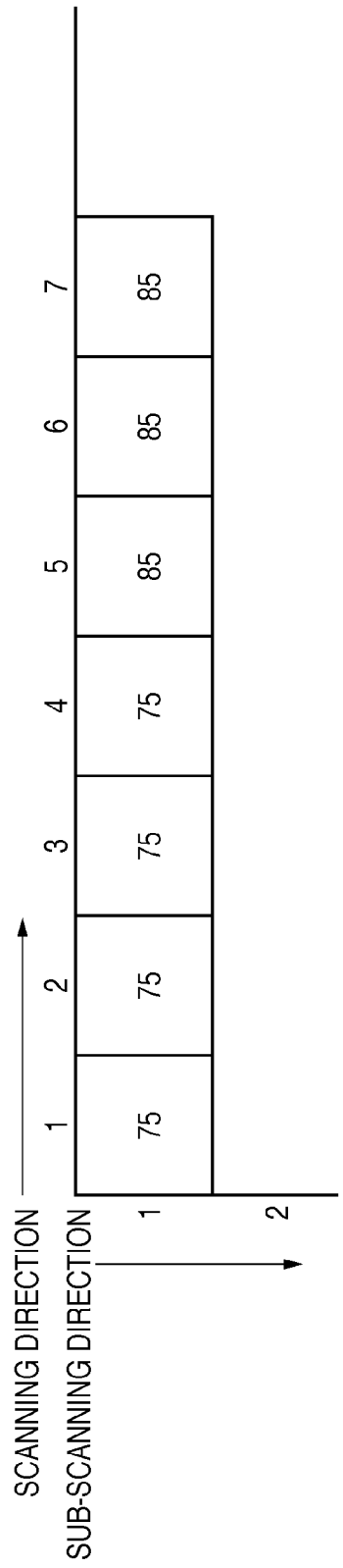

FIG. 5

| INPUT LEVEL | | PIXEL VALUE |
|---|---|---|
| 8 | | 255 |
| | | 255 |
| 7 | | 224 |
| | | 224 |
| 6 | | 192 |
| | | 192 |
| 5 | | 160 |
| | | 160 |
| 4 | | 128 |
| | | 128 |
| 3 | | 96 |
| | | 96 |
| 2 | | 64 |
| | | 64 |
| 1 | | 32 |
| | | 32 |
| 0 | | 0 |
| | | 0 |

IMAGE FORMING APPARATUS AND IMAGE FORMING METHOD

BACKGROUND OF THE INVENTION

1. Field of the Invention

The present invention relates to an image forming apparatus and an image forming method for forming a visible image on a recording medium.

2. Description of the Related Art

Generally, if an image is expressed digitally, the image is expressed with multiple tones at 256 levels, for example. Furthermore, in the case of color images, such images are expressed with multiple tones for each color component, such as RGB or CMYK. However, since ordinary printers cannot express gradations at 256 levels, conventionally, a method has been adopted with which such multiple levels are reduced to a smaller number of levels (for example, two levels or four levels) that such printers can express, using a method called half toning.

For example, Japanese Patent Laid-Open No. 09-74488 (Patent Document 1) discloses technology for expressing an image having 256 levels with two to four levels, using a multi-level error diffusion method. Specifically, in a case in which 256 level data are converted into four level data, by using a threshold table to establish correspondence between 256 level data and four level data, the density data of a pixel of interest is converted into four level data using the multi-level error diffusion method. Then, the error (residual error) after this conversion into four level data is held, and used for adding to the peripheral pixels of the pixel of interest.

However, a dot of a pixel with no dots existing in the periphery, that is, an isolated pixel may become unstable. To cope with this, in order to reduce isolated pixels as much as possible, a method has been adopted with which contiguous pixels are made into a block and handled, and pixels are integrated in that block.

On the other hand, in the case in which pixels are integrated in a block in this way, there is a problem in that overloading may occur since such processing is complicated. As a method for reducing the load applied in such processing, in Japanese Patent Laid-Open No. 2001-309188 (Patent Document 2), image data corresponding to n pixels (n is a natural number) contiguous with each other in an inputted image is averaged, and multi-level error diffusion processing is performed on the averaged image data. Also, technology is disclosed with which based on the image data obtained by performing multi-level error diffusion processing, n pieces of image data expressed with N levels (N is a natural number) depending on a pattern set for each color are generated, and image data corresponding to n pixels is generated.

However, with conventional technology, in the case of averaging an inputted image for each group of a plurality of pixels contiguous with each other, if the difference between the densities of the pixels of such a plurality is great, information on the original image may disappear through averaging, so that an output image may deteriorate.

SUMMARY OF THE INVENTION

The present invention has been achieved in view of the above problems, and provides an image forming apparatus and an image forming method that suppress image deterioration that occurs when converting image data into data having fewer levels.

According to one aspect of the present invention, there is provided an image forming apparatus comprising: an integration unit configured to integrate n pixels (n is a natural number that satisfies $2 \leq n$) that include an input pixel of interest in inputted image data and that are contiguous in a sub-scanning direction, and to decide an average value of pixel values of the n pixels as a pixel value of integrated pixels; a quantization unit configured to quantize the pixel value of the integrated pixels obtained by the integration unit to N levels (N is a natural number that satisfies $3 \leq N$); an image analysis unit configured to perform first determination processing for determining whether a difference between the pixel values of n input pixels that are contiguous in the sub-scanning direction exceeds a threshold value set in advance, and second determination processing for determining whether a direction in which the pixel values of the n input pixels becomes greater is a forward direction of the sub-scanning direction or an opposite direction to the forward direction, and to output determination results of the first and second determing processing; and a determination unit configured to determine n output pixels in the sub-scanning direction, based on the results of the first and the second determination processing performed by the image analysis unit, from a quantization result of the integrated pixels obtained by the quantization unit.

According to another aspect of the present invention, there is provided an image forming method comprising: an integration step of integrating n pixels (n is a natural number that satisfies $2 \leq n$) that include an input pixel of interest in inputted image data and that are contiguous in a sub-scanning direction, and of determining an average value of pixel values of the n pixels as a pixel value of integrated pixels; a quantization step of quantizing the pixel value of the integrated pixels obtained in the integration step to N levels (N is a natural number that satisfies $3 \leq N$); an image analysis step of performing first determination processing for determining whether a difference between the pixel values of n input pixels that are contiguous in the sub-scanning direction exceeds a threshold value set in advance, and second determination processing for determining whether the direction in which the pixel values of the n input pixels becomes greater is a forward direction of the sub-scanning direction or an opposite direction to the forward direction, and of outputting results of the first and second determination processing; and a determination step of determining n output pixels in the sub-scanning direction, based on the determination results of the first and the second determination processing performed by the image analysis unit, from a quantization result of the integrated pixels obtained in the quantization step.

According to the present invention, it is possible to provide an image forming apparatus and an image forming method that suppress image deterioration that occurs when converting image data into data having fewer levels.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing examples of pixel values of input image data.

FIG. 4 is a diagram showing image data outputted from a resolution conversion unit 101.

FIG. 5 is a diagram showing two pixels that correspond to input levels inputted into a pixel selection unit 104 from a quantization unit 103.

DESCRIPTION OF THE EMBODIMENTS

Hereinafter, embodiments of the present invention are described in detail with reference to the attached drawings. It should be noted that the embodiments described below are examples of means for realizing the present invention and, thus, the present invention can be applied to an embodiment obtained by modifying or changing an embodiment below without departing from the scope of the present invention.

First Embodiment

Figure 1:
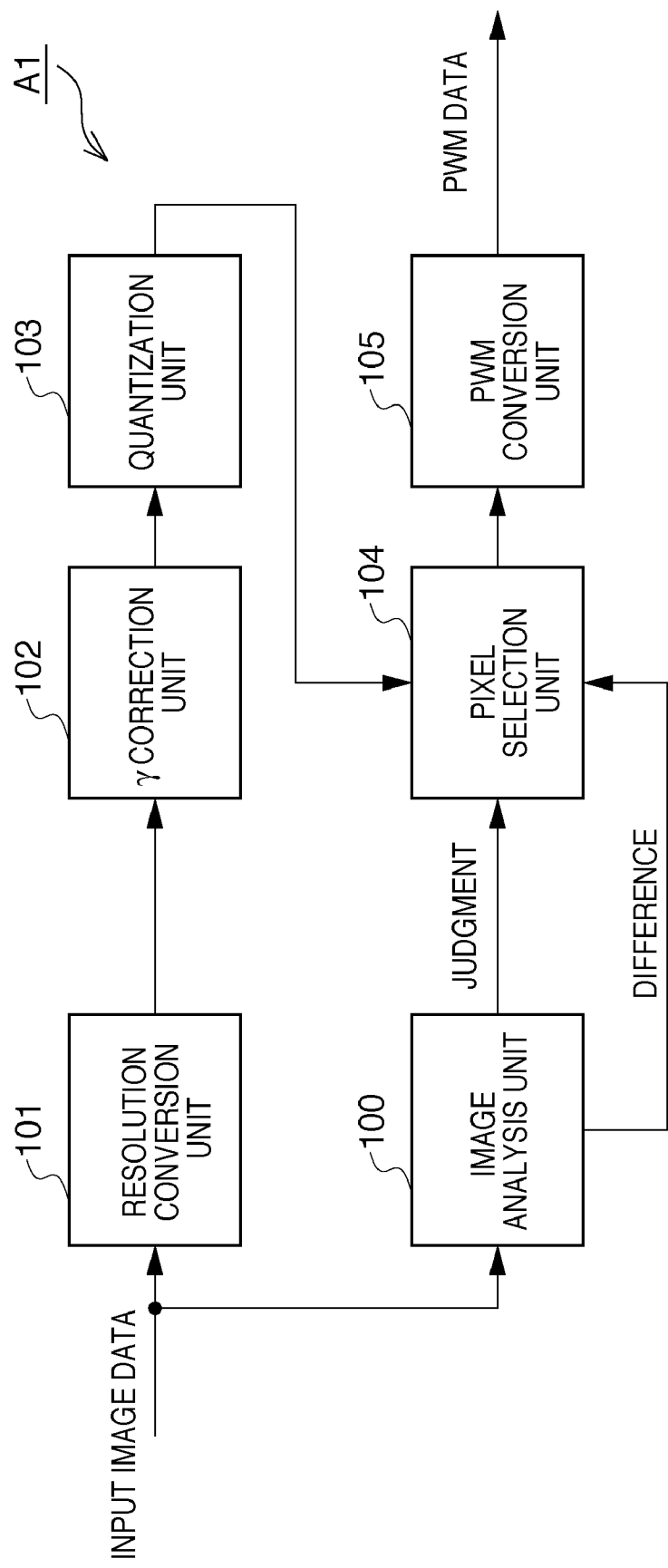
FIG. 1 is a block diagram showing the functional configuration of an image forming apparatus A1 according to a first embodiment of the present invention.

FIG. 1 is a block diagram showing the functional configuration of an image forming apparatus A1 according to a first embodiment of the present invention. The image forming apparatus A1 is an apparatus that converts multi-level image data (for example, L levels (L is a natural number)) into N levels image data (N is $3 \leq N < L$), and forms a visible image on a recording medium according to the N level image data obtained through conversion. Specifically, the image forming apparatus A1 is provided with an image analysis unit 100, a resolution conversion unit 101, a γ correction unit 102, a quantization unit 103, a pixel selection unit 104, and a PWM conversion unit 105. Note that in the following, the transportation direction of a recording medium is set to be a sub-scanning direction, and the direction orthogonal to the sub-scanning direction is set to be a scanning direction.

An input unit (not shown) inputs multi-level image data. The resolution conversion unit 101 functions as an integration unit, integrates n pixels (n is a natural number of $2 \leq n$) that are contiguous in the sub-scanning direction including this input pixel of interest, and determines the average value of the pixel values (multi-level image data) of n pixels as a pixel value of integrated pixels.

The γ correction unit 102 performs γcorrection on the integrated image data. Note if the input image data satisfies certain conditions (for example, if the density has a linear proportional relationship), the γ correction unit 102 does not perform processing. The γ correction unit 102 is connected to the quantization unit 103.

The quantization unit 103 quantizes image data of the integrated pixels output from the resolution conversion unit 101 to N level image data using multi-level error diffusion processing. The quantization unit 103 is connected to the pixel selection unit 104.

The image analysis unit 100 performs first and second determination processing described later, and outputs the determination results of the first and second determination processing. In the first determination processing, it is determined that the difference between pixel values of n input pixels that are contiguous in the sub-scanning direction inputted by the input unit exceeds a threshold value set in advance. In the second determination processing, it is determined that the direction in which the pixel values of n input pixels become greater is a forward direction of the sub-scanning direction or an opposite direction to the forward direction. Furthermore, the image analysis unit 100 outputs the difference between the pixel values of n input pixels used when determining in the first determination processing as a determination result. The image analysis unit 100 is connected to the pixel selection unit 104.

The pixel selection unit 104 generates n output pixels in the sub-scanning direction, from the N level image data of the pixel of interest in the quantization result of the integrated pixels obtained by the quantization unit 103. Further, based on the determination results of the first and second determination processing performed by the image analysis unit 100, the pixel selection unit 104 determines an N level pixel value for each of the n output pixels. If the determination result of the first determination processing performed by the image analysis unit 100 indicates that the difference between the pixel values of n input pixels is less than or equal to the threshold value set in advance, the pixel selection unit 104 determines the pixel value of the pixel of interest obtained by the quantization unit 103 as a pixel value of each of the n output pixels. On the other hand, if the determination result of the first determination processing performed by the image analysis unit 100 indicates that the difference between the pixel values of n input pixels exceeds the threshold value set in advance, the pixel selection unit 104 determines the pixel value of each of the n output pixels according to the direction indicated by the determination result of the second determination processing.

Further, the pixel selection unit 104 has a table showing a plurality of distribution methods set in advance. If the determination result of the first determination processing performed by the image analysis unit 100 indicates that the difference between the pixel values of n input pixels exceeds the threshold value set in advance, using one table determined according to this difference, the pixel selection unit 104 determines the pixel values of n output pixels. The pixel selection unit 104 is connected to the PWM conversion unit 105.

The PWM conversion unit 105 converts the output from the pixel selection unit 104 into a PWM signal, in order to transmit the signal to an exposure apparatus. Note that hereinafter, image data outputted from the PWM conversion unit 105 is also referred to as output image data.

Figure 2:
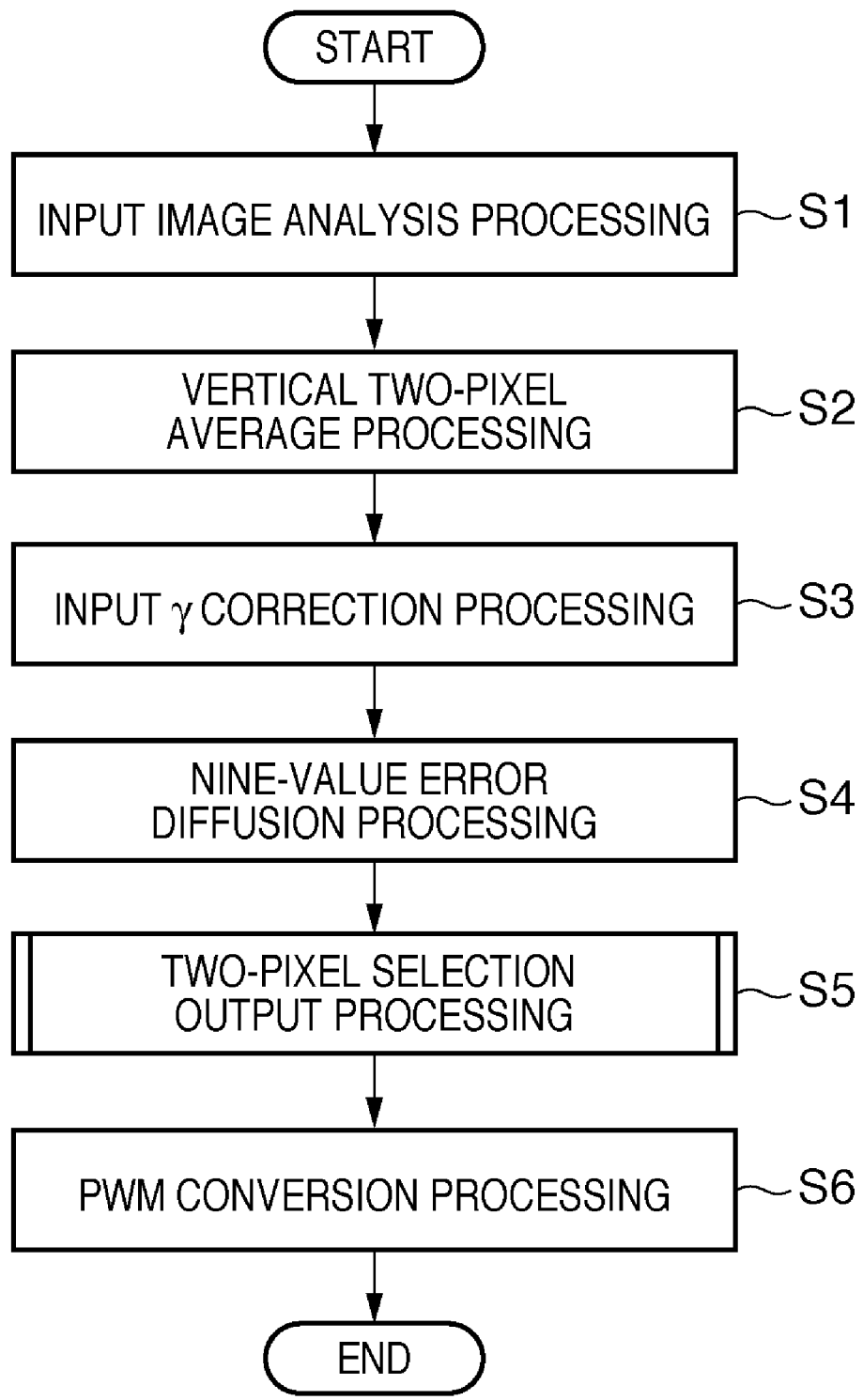
FIG. 2 is a diagram showing the operational procedure for the image forming apparatus A1 according to the first embodiment.

FIG. 2 is a diagram showing the operational procedure for the image forming apparatus A1 according to the first embodiment, and FIG. 3 is a diagram showing examples of pixel values of input image data. Note that an image inputted into the image analysis unit 100 is assumed to be a CMYK color image, the number of levels L of each color is set to 256, output image data is assumed to have the same resolution as that of the original image data, and the number M of error diffusion output levels is set to 9. Further, n, indicating the number of pixels that are contiguous in the sub-scanning direction, is set to 2.

In step S1, the image analysis unit 100 computes the difference between pixel values of two pixels that are contiguous in the sub-scanning direction, and compares the result with a threshold value.

FIG. 3 shows input image data in the range of one to seven pixels in the scanning direction, and one to two pixels in the sub-scanning direction. The value written in each pixel (square block) shows the pixel value of each pixel. First, the image analysis unit 100 sequentially calculates difference values between one pixel in the scanning direction and two pixels in the sub-scanning direction, in the scanning direction, using the following equation.

A difference value=|a pixel value of an upper pixel−a pixel value of a lower pixel|   (Equation 1)

As shown in FIG. 3, the difference between pixel values of two pixels in the sub-scanning direction for the first pixels in the scanning direction is 50 (a difference value =|100−50|), when applying Equation 1. Next, the image analysis unit 100 determines whether or not the difference value is greater than the threshold value. If it is determined that the difference value is greater than the threshold value, the difference value between the two pixels that are being processed, and a 2-bit determination signal for determining whether or not the difference value is greater than the threshold value are outputted to the pixel selection unit 104 according to the timing when the two pixels being currently processing by the image analysis unit 100 are processed by the pixel selection unit 104.

In a 2-bit determination signal, the second bit is information that indicates whether a difference value is greater than a threshold value. For example, if the second bit is 1, the difference value is greater than the threshold value, and if the second bit is 0, the difference value is less than or equal to the threshold value. On the other hand, the first bit is information that indicates which pixel value is greater. For example, the upper pixel value is shown as being greater than the lower pixel value when the first bit is 1, and the upper pixel value is shown as being less than or equal to the lower pixel value when the first bit is 0.

Here, the output procedure for a difference value, and the output procedure for 2-bit data are described using specific numerical values. In FIG. 3, the difference between the pixel values of two pixels in the sub-scanning direction for the fifth pixels in the scanning direction is 70 based on Equation 1 and, accordingly, if a threshold value is set to 60 in the first embodiment, 70 is greater than the threshold value, and a 2-bit determination signal is outputted to the pixel selection unit 104. In the above example, since the upper pixel value is greater than the lower pixel value, the second bit of the 2-bit data is 1, and the first bit thereof is 1.

In the case of FIG. 3, the difference between two pixels in the sub-scanning direction for the first to fourth pixels in the scanning direction is 50 (=100−50), and the difference between two pixels in the sub-scanning direction for the fifth to seventh pixels is 70 (=120−50). Therefore, since the difference between two pixels for the first to fourth pixels in the scanning direction is less than 60, which is the threshold value, the difference value 50 is outputted to the pixel selection unit 104, and a 2-bit determination signal is outputted with the second bit thereof being 0, and the first bit thereof being 1. Since the difference between two pixels for the fifth to seventh pixels is greater than 60, the difference value 70 is outputted to the pixel selection unit 104, and a 2-bit determination signal is outputted with both the second bit and first bit thereof being 1.

Next, in step S2, the resolution conversion unit 101 performs vertical two-pixel average processing. Specifically, the resolution conversion unit 101 averages the image data of two pixels that are contiguous in the sub-scanning direction using Equation 2, and generates one new pixel image data.

An average value=(a pixel value of an upper pixel+a pixel value of a lower pixel)/2   (Equation 2)

Next, the details of vertical two-pixel average processing (step S2) are described with reference to FIGS. 3 and 4. FIG. 4 is a diagram showing image data outputted from the resolution conversion unit 101.

A description is given assuming a case in which the image data shown in FIG. 3 is inputted into the resolution conversion unit 101. The pixel values of two pixels (an upper pixel and a lower pixel) that are contiguous in the scanning direction that are the first pixels in the sub-scanning direction are 100 and 50.

The resolution conversion unit 101 calculates the average value of two pixels that are aligned in the sub-scanning direction using Equation 2 (vertical two-pixel average processing). FIG. 4 shows the result obtained by performing average processing in this way. Specifically, the average value of pixels for the first to fourth pixels in the scanning direction is 75 if Equation 2 is used, and the average value of pixels for the fifth to seventh pixels in the scanning direction is 85 if Equation 2 is used. These pieces of image data are sequentially outputted for output γ correction processing performed by the γ correction unit 102 in step S3. As shown in FIG. 4, the number of pixels in the sub-scanning direction is reduced by half through this average processing. In other words, the resolution of the sub-scanning direction is converted to ½.

Note that although the resolution of the sub-scanning direction is reduced by ½ in this way, since the resolution is doubled in step S5 described later, the size of the final output image data corresponds to that of the original image data.

Next, in step S3, the γ correction unit 102 performs γ correction of the image data on which vertical two-pixel average processing has been performed. Then, in step S4, the quantization unit 103 performs nine-level error diffusion processing using a multi-level error diffusion method. In nine-level error diffusion processing, after quantizing the inputted data having 256 levels to nine levels, an error due to quantization is diffused to the peripheral unprocessed pixels, thereby expressing levels. Accordingly, the error (residual error) after this conversion into nine values is held, and when converting the next pixel into nine values, a weight is assigned to the above held error, and the resultant error is added to the peripheral pixels thereof and, thus, this conversion into nine values is repeated.

Next, in step S5, the pixel selection unit 104 selects the pixel values of two pixels that are contiguous in the sub-scanning direction according to the nine-value image data quantized by the quantization unit 103.

Note that the pixel selection unit 104 has stored pixel values according to input levels (0 to 8) in a memory (not shown) in advance in order to perform this selection processing. FIG. 5 is a diagram showing pixel values of two pixels corresponding to quantized nine-value image data. In the present embodiment, if an input level is 0, the pixel values of both of the corresponding two pixels are set to 0. Further, every time the input level increases by one, the pixel values of both of the corresponding two pixels are increased by 32. The pixel values of two pixels corresponding to the input levels shown here are examples, and other pixel values may be used.

Further, since it is necessary to provide a difference for pixel values of two pixels according to the difference value therebetween, the pixel selection unit 104 holds the image data of two pixels corresponding to each difference value in the above-mentioned memory. Pixel values corresponding to typical difference values are stored in this memory in advance to reduce its size. For example, the above-mentioned memory has stored therein only (255, 192) for pixel values corresponding to the input level 7; two types, namely (255, 128) and (224, 160), for pixel values corresponding to the input level 6; three types, namely (255, 64), (224, 96), and (192, 128), for pixel values corresponding to the input level 5; four types, namely (255, 0), (224, 32), (192, 64), and (160, 96), for pixel values corresponding to the input level 4; three types, namely (192, 0), (160, 32), and (128, 64), for pixel values corresponding to the input level 3; two types, namely (128, 0), and (96, 32), for pixel values corresponding to the input level 2; and only (64, 0) for pixel values corresponding to the input level 1.

Figure 6A:
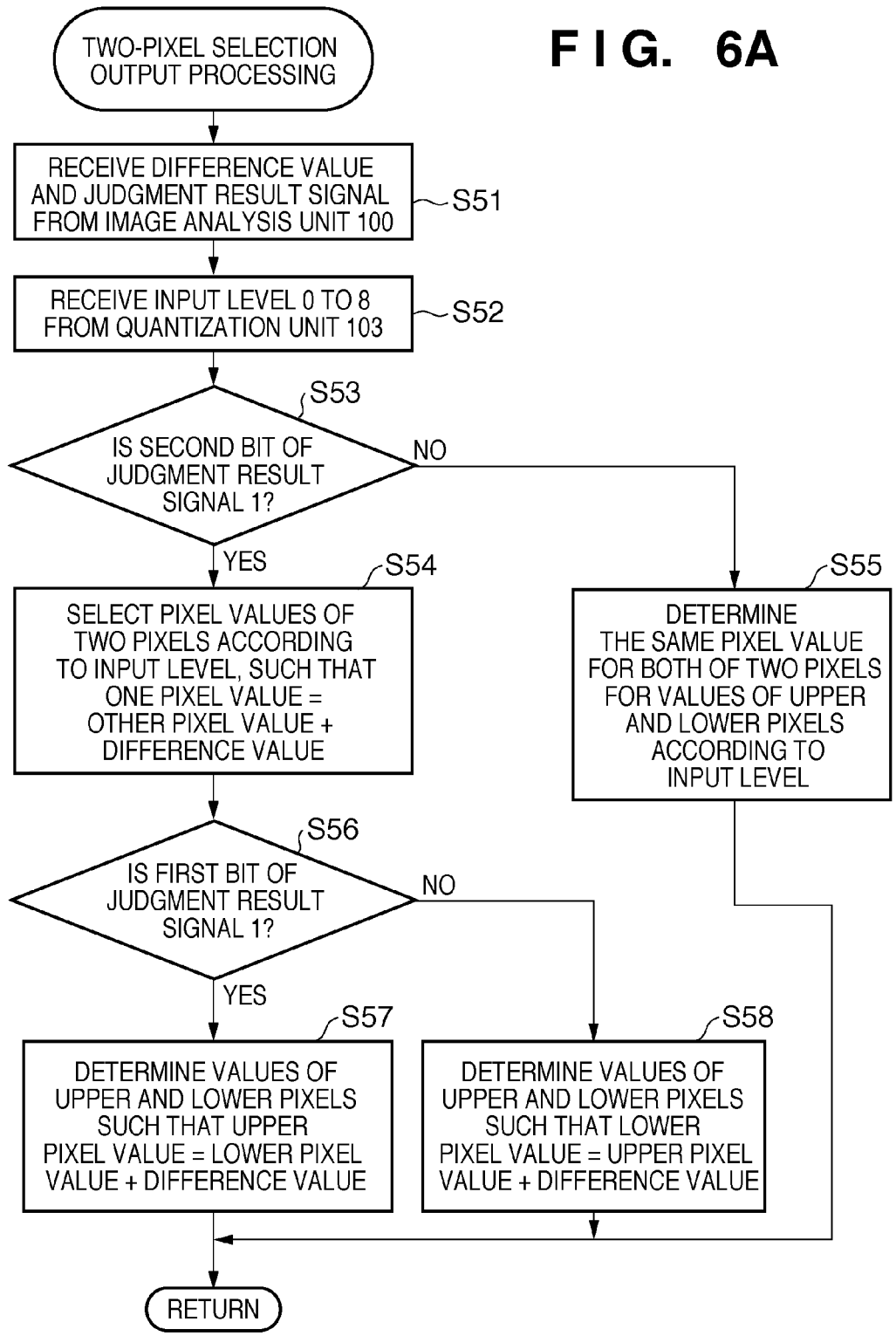
FIG. 6A is a diagram showing the detailed processing procedure of two-pixel selection output processing (step S5).

Here, the detailed procedure of two-pixel selection output processing (step S5) is described with reference to FIG. 6A. First, the pixel selection unit 104 receives the difference value between two pixels, and a 2-bit determination result signal from the image analysis unit 100 (step S51). Of the two bits, the second bit indicates determination result information regarding whether or not a difference value is less than or equal to a threshold value, and if a difference value is less than or equal to a threshold value, the second bit is represented by 0, and if a difference value is greater than a threshold value, the second bit is represented by 1. Further, the first bit indicates determination result information regarding whether or not an upper pixel value is greater than a lower pixel value, and if an upper pixel value is greater than a lower pixel value, the first bit is represented by 1, and if the upper pixel value is less than or equal to the lower pixel value, the first bit is represented by 0.

Furthermore, the pixel selection unit 104 receives nine-value image data (the input level 0 to 8) from the quantization unit 103 (step S52). Then, the pixel selection unit 104 determines whether or not the second bit of the determination result signal is 1 (step S53). In other words, step S53 corresponds to first determination processing for determination whether or not the difference between pixel values of n input pixels that are contiguous in the sub-scanning direction exceeds the threshold value set in advance.

If the second bit is 0, the pixel selection unit 104 selects the same pixel value for both the two pixels from the above-mentioned memory according to the input level 0 to 8, and determines that pixel value for the values of upper and lower pixels (step S55).

Figure 6B:
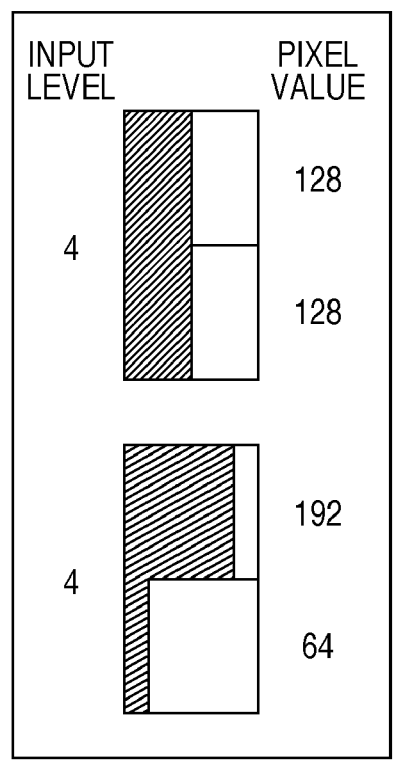
FIG. 6B is a diagram showing pixel values inputted into the pixel selection unit 104, and pixel values outputted from the pixel selection unit 104.

For example, if the input level from the quantization unit 103 is 4, in step S55, as shown in the upper diagram in FIG. 6B, 128 that is the same pixel value for both of the two pixels is determined as the values of upper and lower pixels. On the other hand, if the second bit is 1, the pixel selection unit 104 selects the pixel values of two pixels according to the input level, such that one pixel value is greater than the other pixel value only by the difference value (step S54).

For example, if the input level from the quantization unit 103 is 4, and the difference value is 128, (192, 64) are selected from the above-mentioned memory in step S54. Note that which of pixel values selected here is to be disposed as the upper pixel value is not determined.

Next, the pixel selection unit 104 determines whether or not the first bit of the determination result signal is 1 (step S56). In other words, step S56 corresponds to second determination processing for determining whether the direction in which the pixel values of n input pixels become greater is a forward direction of the sub-scanning direction or an opposite direction to the forward direction.

If the first bit is 0, the pixel selection unit 104 determines values of upper and lower pixels from the pixel values selected in step S54, such that the lower pixel value is greater than the upper pixel value only by the difference value (step S58). For example, from the pixel values (192, 64) selected in step S54, as shown in FIG. 6B, it is determined that the upper pixel value is 64, and the lower pixel value is 192.

On the other hand, if the first bit is 1, the pixel selection unit 104 determines the values of upper and lower pixels from the pixel values selected in step S54, such that the upper pixel value is greater than the lower pixel value only by the difference value (step S57). For example, from the pixel values (192, 64) selected in step S54, it is determined that the upper pixel value is 192, and the lower pixel value is 64.

In this way, the pixel selection unit 104 determines the pixel values of two pixels that are aligned vertically, and outputs the determined pixel values to the PWM conversion unit 105 in step S6.

Note that the order in which the upper and lower pixels are outputted may be changed such that pixel values are outputted in the order (lower, upper) when the first bit of a determination signal is 0, and in the order (upper, lower) when the first bit of a determination signal is 1.

Figure 7:
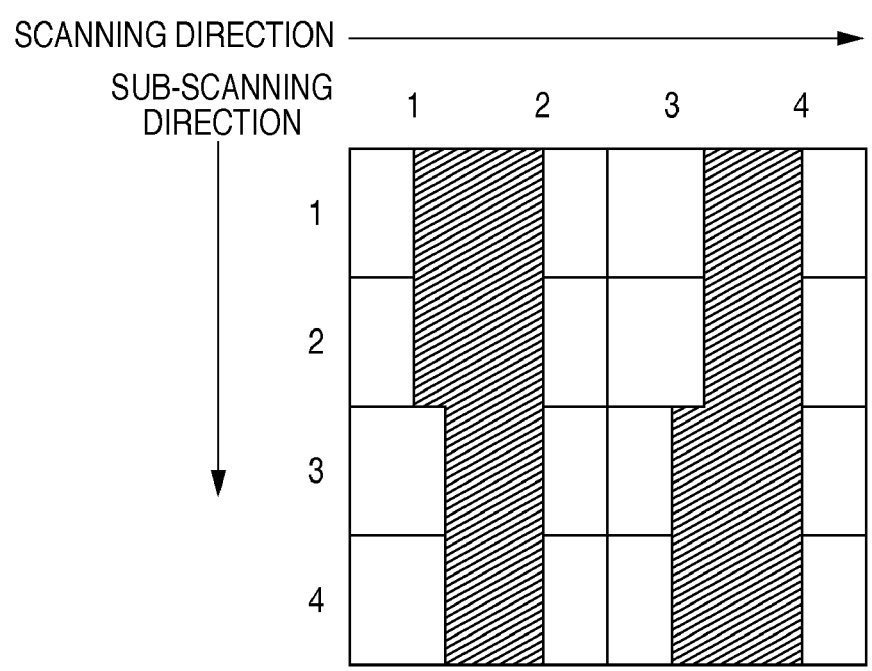
FIG. 7 is a diagram showing an example of PWM conversion processing (step S6) performed by a PWM conversion unit 105.

Next, in step S6, the PWM conversion unit 105 performs processing for outputting dots in a stabilized manner. FIG. 7 is a diagram showing an example of PWM conversion processing (step S6) performed by the PWM conversion unit 105. In image data outputted from the pixel selection unit 104, dots are grown for the left side from the right side in odd-numbered pieces of image data in the scanning direction, and dots are grown for the right side from the left side in even-numbered pieces of image data. In this way, by causing dots to be grown, it is possible to form dots in a more stabilized manner. After the PWM conversion processing in step S6 ends, output image data is complete.

Note that in the present embodiment, a configuration in which a 2-bit determination signal and a difference value are outputted from the image analysis unit 100 is applied, however, the configuration is not limited to this, and a configuration in which a 1-bit determination signal and a difference value are outputted may be applied, for example. In this case, only information indicating the size relationship of values of two pixels may be used as a determination signal, and the pixel selection unit 104 in the later stage may perform threshold determination for a difference value. According to the present embodiment as described above, since it is possible to reduce, to 1/n, the number of pixels that are processed in error diffusion processing that requires the greatest processing load, the entire processing load can be greatly reduced. Further, by adjusting input values for PWM using the result of analysis by the image analysis unit 100, it is possible to avoid a lack of information (image quality deterioration) due to the number of pixels being reduced. Further, since it is possible to maximize the overlap of dots through PWM in the sub-scanning direction, images can be stabilized, and at the same time, the image quality can be enhanced. Further, by controlling the direction in which dots are grown in PWM conversion processing, the contiguity of PWM in the scanning direction is improved and, thus, more stable dots are formed on a sheet.

Second Embodiment

Figure 8:
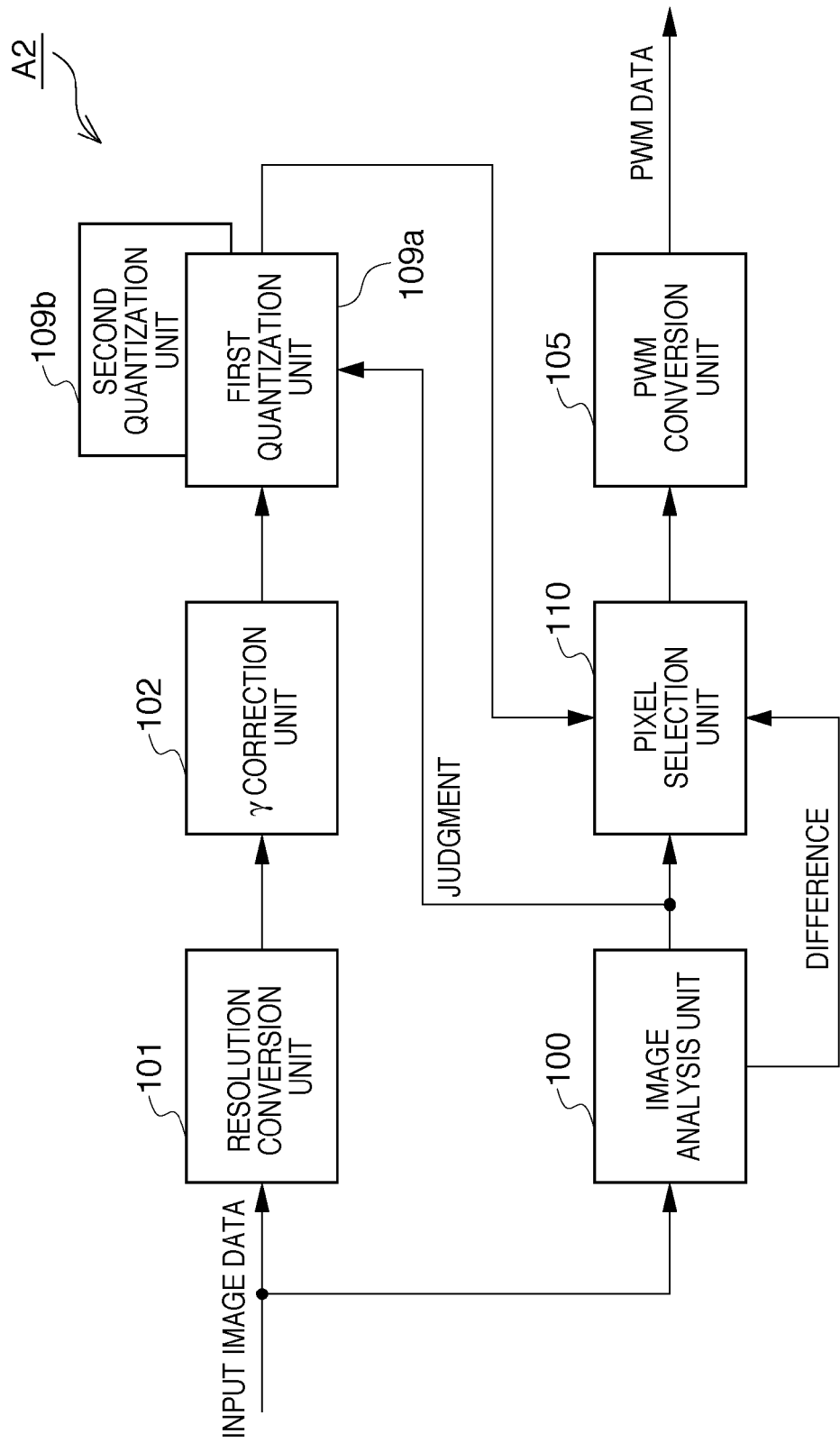
FIG. 8 is a block diagram showing the functional configuration of an image forming apparatus A2 according to a second embodiment.

FIG. 8 is a block diagram showing the functional configuration of an image forming apparatus A2 according to a second embodiment. The image forming apparatus A2 converts multi-level image data into image data having N levels (N is a natural number that satisfies 3≦N), the number of which is less than the number of levels of this multi-level image data, and forms a visible image on a recording medium according to the image data obtained through conversion. Further, compared with the image forming apparatus A1 in the first embodiment, the image forming apparatus A2 differs in outputting a threshold determination result of a difference value in the sub-scanning direction from the image analysis unit 100 to a quantization unit 109 as well, in addition a pixel selection unit 110.

Specifically, the image forming apparatus A2 is provided with an input unit, a resolution conversion unit 101, a first quantization unit 109a, a second quantization unit 109b, an image analysis unit 100, and a pixel selection unit 110. Note that in the following, the transportation direction of a recording medium is set to be a sub-scanning direction, and the direction orthogonal to the sub-scanning direction is set to be a scanning direction.

Although the input unit is not shown, the unit inputs multi-level image data into the image forming apparatus A2.

The resolution conversion unit 101 functions as an integration unit, integrates an input pixel of interest in the image data inputted by the input unit, and n pixels that are contiguous in the sub-scanning direction including this input pixel of interest, and determines the average value of pixel values of n pixels as a pixel value of integrated pixels. Note that n is a natural number that satisfies 2≦n.

The first quantization unit 109a quantizes image data constituted from the integrated pixels obtained by the resolution conversion unit 101 to image data having N levels. The second quantization unit 109b quantizes image data constituted from the integrated pixels obtained by the resolution conversion unit 101 to image data having M levels (M is a natural number that satisfies M<N).

The image analysis unit 100 performs first and second determination processing, and outputs the determination results of the first and second determination processing. In the first determination processing, it is determined whether the difference between pixel values of n input pixels that are contiguous in the sub-scanning direction inputted by the input unit exceeds a threshold value set in advance. In the second determination processing, it is determined whether the direction in which the pixel values of n input pixels become greater is a forward direction of the sub-scanning direction or an opposite direction to the forward direction.

The pixel selection unit 110 functions as a selecting unit, and if the determination result of the first determination processing performed by the image analysis unit 100 indicates that the difference between pixel values of n input pixels is less than or equal to the threshold value set in advance, selects the quantization result obtained by the first quantization unit 109a. On the other hand, if the determination result of the first determination processing performed by the image analysis unit 100 indicates that the difference between pixel values of n input pixels exceeds the threshold value set in advance, the pixel selection unit 110 selects the quantization result obtained by the second quantization unit 109b.

Also, the pixel selection unit 110 functions as a determination unit. Specifically, the pixel selection unit 110 generates n output pixels in the sub-scanning direction from the pixel of interest in the selected quantization result, and based on the determination results of the first and second determination processing performed by the image analysis unit 100, determines a pixel value expressed with N levels for each of the n output pixels.

Next, the operational procedure for the image forming apparatus A2 is described with reference to the flowchart shown in FIG. 2. Note that an image inputted into the image analysis unit 100 is assumed to be a CMYK color image, the number of levels L of each color is set to 256, output image data is assumed to have the same resolution as that of the original image data, and the number M of error diffusion output levels is set to 9 or 3. Further, n indicating the number of pixels that are contiguous in the sub-scanning direction is set to 2.

Input image analysis processing (step S1) performed by the image analysis unit 100 differs from the first embodiment only in a difference value and a 2-bit determination signal being outputted to the quantization unit 109 and the pixel selection unit 110, and other processes are the same as those in the first embodiment. Further, the operations in vertical two-pixel average processing (step S2) performed by the resolution conversion unit 101, and input γ correction processing (step S3) performed by the γcorrection unit 102 are the same as those in the first embodiment.

Next is a description regarding the operational procedure in nine-level error diffusion processing (step S4) performed by the quantization unit 109. In the present embodiment, as multi-level error diffusion processing, two types of processing, namely, ternary error diffusion processing and nine-level error diffusion processing are used. Since ternary error diffusion processing is the same as nine-level error diffusion processing except quantizing to three values, a description thereof is omitted.

In the present embodiment, for a 2-bit determination signal outputted from the image analysis unit 100, based on the determination signal that indicates whether or not the difference value between two pixels in the sub-scanning direction is greater than a threshold value, ternary error diffusion processing and nine-level error diffusion processing are switched. For example, if data with the second bit of the 2-bit determination signal, indicating whether or not the difference value is greater than a threshold value, being set to 1 is inputted into the quantization unit 109, ternary error diffusion processing is executed. On the other hand, if data with the second bit being set to 0 is inputted, nine-level error diffusion processing is executed.

Next is a description regarding the operational procedure in two-pixel selection output processing (step S5) performed by the pixel selection unit 110. If nine-level error diffusion processing is performed by the pixel selection unit 110, a nine-value input level (tone level) 0 to 8 is inputted, and if ternary error diffusion processing is performed, a ternary input level (tone level) 0 to 2 is inputted. Note that since a 2-bit determination signal is inputted into the pixel selection unit 110 similar to the first embodiment, it can be determined that ternary error diffusion processing has been performed.

Figure 9:
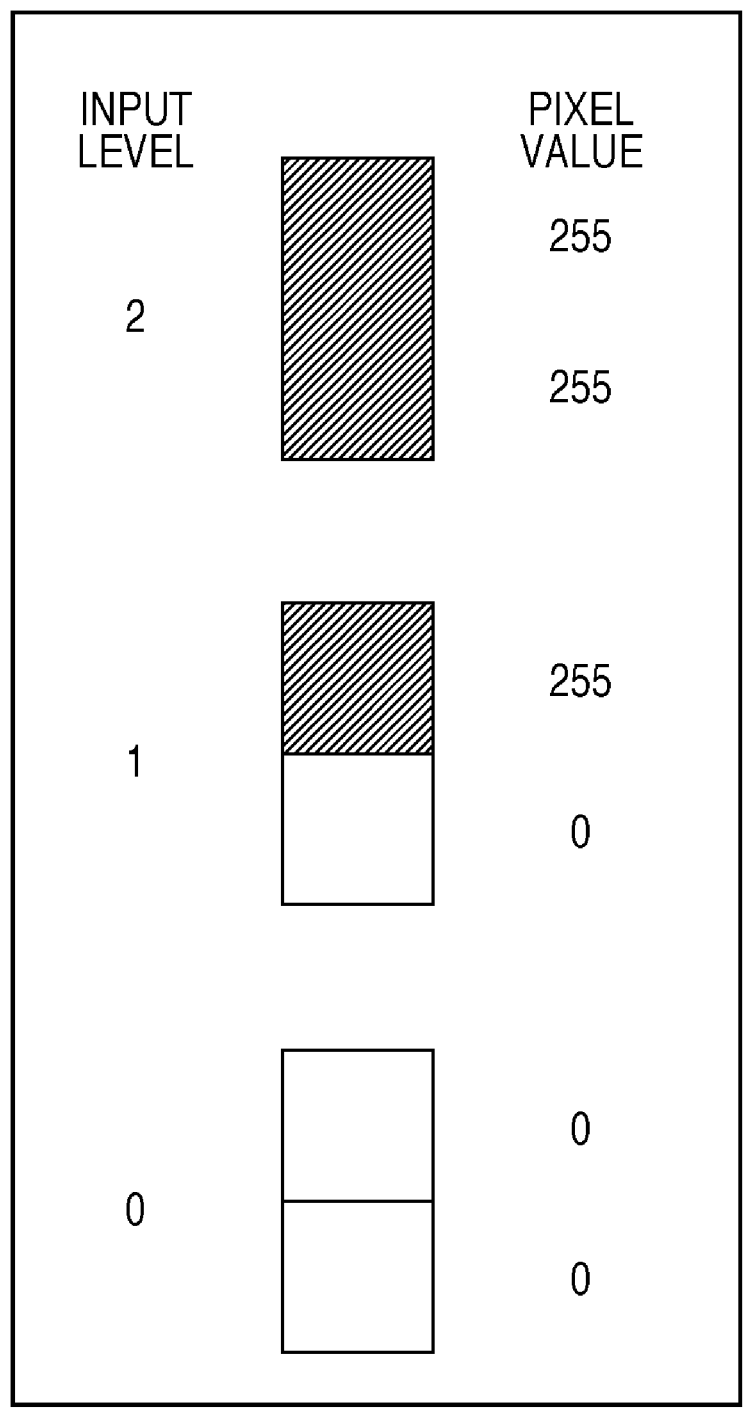
FIG. 9 is a diagram showing values of two pixels in a case in which ternary error diffusion processing is selected.

FIG. 9 is a diagram showing values of two pixels if ternary error diffusion processing is selected. In a case in which ternary error diffusion processing has been performed, if an input level is 0, the pixel values of both the corresponding two pixels are set to 0. If an input level is 1, of the two pixels, the pixel value of one pixel is set to 255, and the pixel value of the other pixel is set to 0 (the upper and lower relationship is determined based on the first bit of a 2-bit determination signal). If an input level is 2, the pixel value of both the corresponding two pixels is set to 255. If nine-level error diffusion has been performed, the pixel values of two pixels corresponding to an input level are the same as those in the first embodiment.

A detailed description is given regarding the operational procedure if ternary error diffusion processing is performed. Assume a case in which an input level is 1, the second bit of 2-bit data indicating whether or not ternary error diffusion processing has been performed is 1, and the first bit thereof is 1. In this case, of two pixels to be outputted to the PWM conversion unit 105, the pixel selection unit 104 sets the pixel value of an upper pixel to 255, and sets the pixel value of a lower pixel to 0, and outputs the pixel values to the PWM conversion unit 105.

Since PWM conversion processing performed by the PWM conversion unit 105 (step S6) is the same as that in the first embodiment, a description thereof is omitted.

Note that although the output in ternary error diffusion processing is set to 0 to 2 in the above example, the output is not limited to this, and may be 0, 4, and 8. In this case, since levels therefor correspond to the levels for nine-level error diffusion processing, processing after pixel selection processing can be the same as that in the first embodiment.

According to the present embodiment as described above, a circuit is simplified by switching the number of error diffusion processing levels according to a difference value. In particular, if the processing is switched to ternary error diffusion processing when a difference value is great, a pixel value table according to difference values is not needed. Further, if a difference greater than a threshold value is generated, since a difference value is expanded, an edge portion becomes clearer. In particular, in a character/line drawing (graphics) portion, a great effect of improving image quality is achieved. On the other hand, since the contiguity of dots other than those of an edge portion is almost equivalent to that in the first embodiment, stable dots can be formed on a sheet.

Third Embodiment

An image forming apparatus in the present embodiment has configurations in the first and second embodiments, and properly uses the configuration in the first or second embodiment for each color. For example, for CMYK, the configuration in the second embodiment is used only for black (K), which is important for image quality in a character/line drawing (graphics) portion, and the configuration in the first embodiment is used for the others: cyan (C), magenta (M), and yellow (Y).

Specifically, in the present embodiment, the pixel selection unit 110 includes a determination unit that determines whether the color component to be processed is black (K), or non-black (CMY). Further, if the determination unit determines that the color component to be processed is non-black, the pixel selection unit 110 unconditionally selects the quantization result obtained by the first quantization unit 109a. On the other hand, if the determination unit determines that the color component to be processed is black, the pixel selection unit 110 selects the quantization result obtained by the second quantization unit 109b.

According to the present embodiment as described above, it is possible to select a quantization result with a different number of levels for each color plane, which enables further improvement in image quality.

Note that for CMYK, the configuration in the first embodiment may be used for cyan (C) and yellow (Y), to which visual sensitivity regarding resolution is comparatively low, and the configuration in the second embodiment may be used for magenta (M) and black (K) to which visual sensitivity regarding resolution is comparatively high. In this case, a similar effect to that in the present embodiment can also be obtained.

Fourth Embodiment

Figure 10:
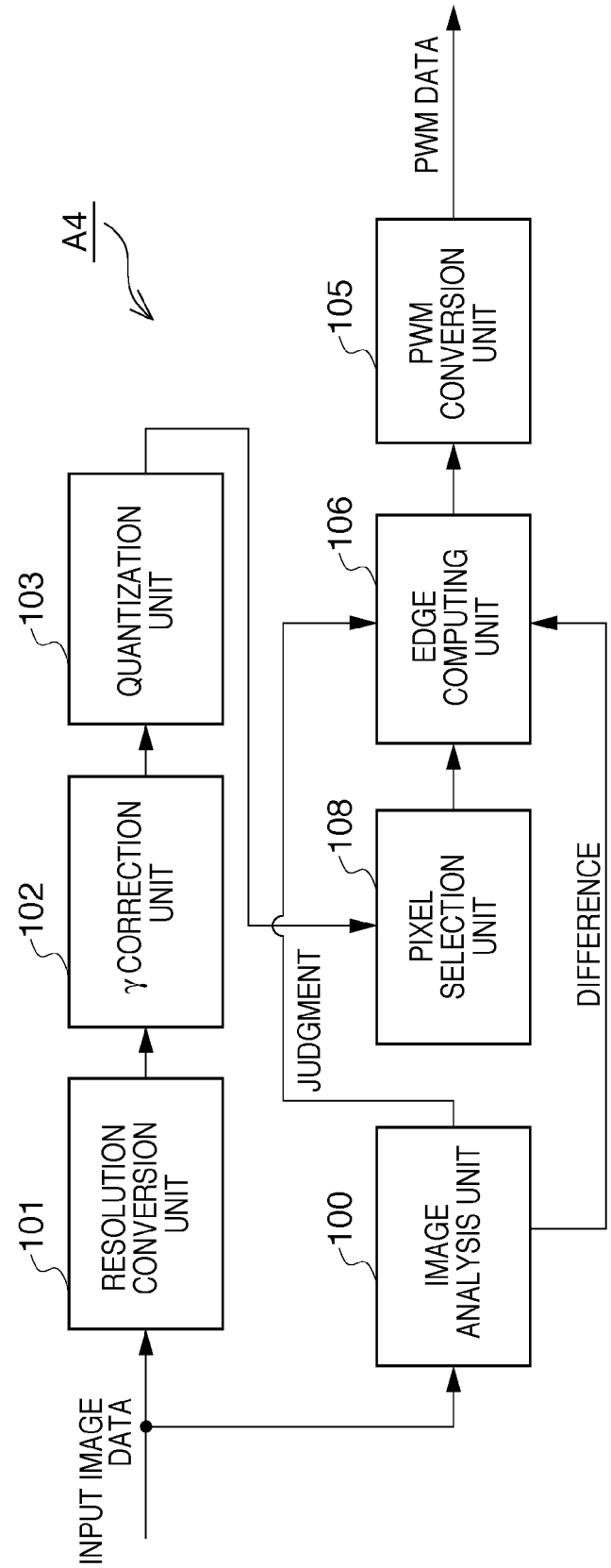
FIG. 10 is a block diagram showing the functional configuration of an image forming apparatus A4 according to a fourth embodiment.

FIG. 10 is a block diagram showing the functional configuration of an image forming apparatus A4 according to a fourth embodiment. Note that an image inputted into the image analysis unit 100 is assumed to be a CMYK color image, the number of levels L of each color is set to 256, output image data is assumed to have the same resolution as that of the original image data, and the number M of error diffusion output levels is set to 9. Further, n indicating the number of pixels that are contiguous in the sub-scanning direction is set to 2.

The image forming apparatus A4 has a configuration with an edge computing unit 106 being added to that of the image forming apparatus A1 in the first embodiment. Further, the image forming apparatus A4 outputs, to the edge computing unit 106, a 2-bit determination signal that indicates the threshold determination for a difference value in the sub-scanning direction and the size relationship between pixel values, and a difference value between two pixels in the sub-scanning direction, from the image analysis unit 100. This 2-bit determination signal is the same as that in the first embodiment.

Specifically, in the present embodiment, of a plurality of pixels that are contiguous in the sub-scanning direction of an inputted image, the image analysis unit 100 calculates the difference between pixel values of pixels contiguous with each other and analyzes the result. A pixel selection unit 108 selects an output pixel based on the value outputted from the quantization unit 103. The edge computing unit 106 changes the output pixel value selected by the pixel selection unit 108.

Figure 11:
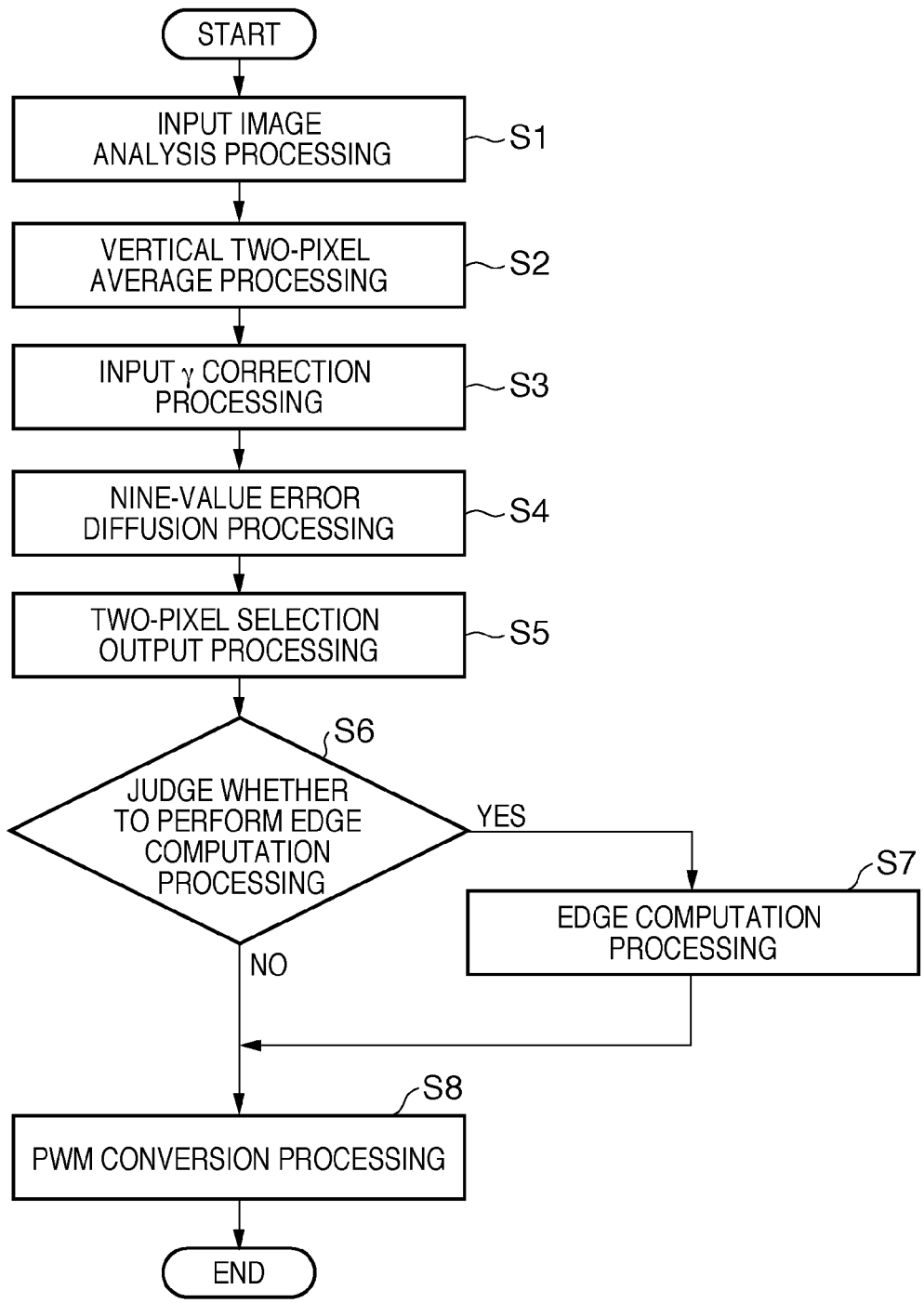
FIG. 11 is a diagram showing the operational procedure for the image forming apparatus A4 according to the fourth embodiment.
Figure 12:
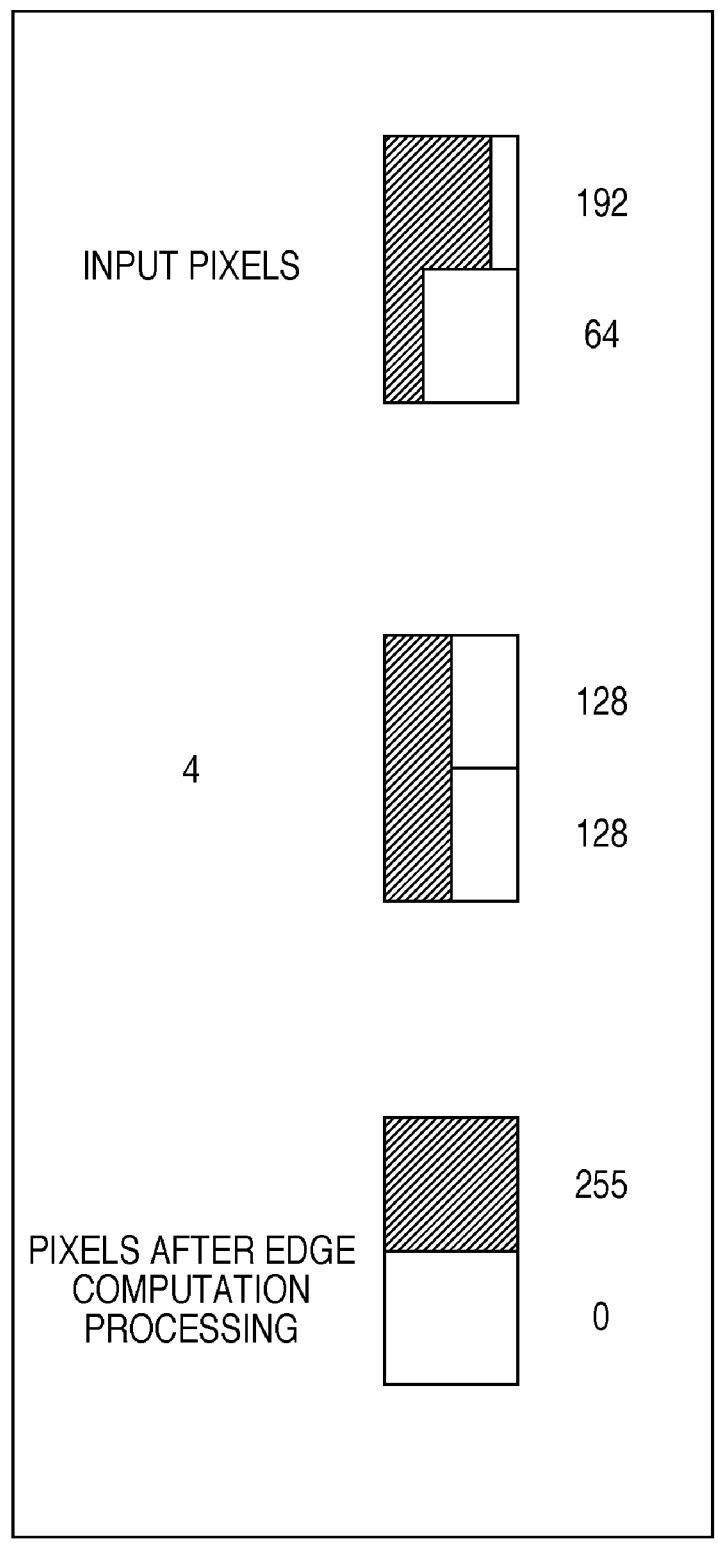
FIG. 12 is a diagram showing examples of pixel values inputted into an image analysis unit 100, examples of pixel values that a pixel selection unit 108 selected based on a value after multiple-level error diffusion, and examples of pixel values after edge computation processing.

FIG. 11 is a diagram showing the operational procedure for the image forming apparatus A4 according to the fourth embodiment. In FIG. 12, the upper diagram shows examples of pixel values inputted into the image analysis unit 100, the middle diagram shows examples of pixel values selected by the pixel selection unit 108 based on the value after multi-level error diffusion, and the lower diagram shows examples of pixel values after edge computation processing.

In FIG. 10, the image analysis unit 100 generates a 2-bit determination signal similar to the first embodiment. The present embodiment differs from the first embodiment in two points, namely, a 2-bit determination signal and the difference value between two pixels in the sub-scanning direction being outputted to the edge computing unit 106, and the above signal not being outputted to the pixel selection unit 108.

Note that a difference value is a value calculated using Equation 1 in the first embodiment. The following is a description assuming a case in which a threshold value for distinguishing whether pixels are an edge is 100 in the image analysis unit 100, and the upper pixel value is 192 and the lower pixel value is 64, which are shown in the upper diagram in FIG. 12 and inputted into the image analysis unit 100.

In the above example, the difference value between the upper pixel value and the lower pixel value is 128, and is greater than 100, which is the threshold value for distinguishing whether pixels are an edge, and the upper pixel value is greater than the lower pixel value. Therefore, the image analysis unit 100 sets the second bit of a 2-bit determination signal to 1 (greater than the threshold value), and sets the first bit thereof to 1 (the upper pixel value is greater than the lower pixel value). The image analysis unit 100 inputs the 2-bit determination signal that has been set, and the difference value 128 calculated using Equation 1 in the first embodiment, into the edge computing unit 106 according to a similar timing to that in the first embodiment.

Since operations of the resolution conversion unit 101, the γ correction unit 102, the quantization unit 103, and the PWM conversion unit 105 are the same as those in the first embodiment, a description thereof is omitted. Note that the pixel selection unit 108 converts the output level of the quantization unit 103 into a pixel value, irrespective of the determination signal or the difference value. Note that although the upper and lower pixel values are the same here, different values may be used. In that case, it is assumed that, in the edge computing unit 106, pixel values can be permutated so as to match the first bit of a determination signal.

In step S6, the edge computing unit 106 determines whether or not a pixel of interest is an edge based on a 2-bit determination signal. If the pixel of interest is an edge, the edge computing unit 106 performs edge computation processing in step S7. In the above example, since the second bit of the 2-bit determination signal is 1, edge computation processing is performed in step S7.

The middle diagram in FIG. 12 shows pixels outputted from the pixel selection unit 108 based on the value outputted from the quantization unit 103, and in the above example, the upper pixel value is 128 and a lower pixel value is 128. The edge computing unit 106 shown in FIG. 10 performs an edge computation using pixels from the pixel selection unit 108, the 2-bit determination signal from the image analysis unit 100 (the second bit is 1, and the first bit is 1), and the difference value 128. Specifically, the following operations are performed.

A value outputted from the quantization unit 103 is 0 to 8, and if this is converted into two pixels' worth of density, the result will be 0, 64, 128, 192, 256, 320, 384, 448, or 510. The value obtained by a difference value being subtracted from this converted density and reduced by ½ (1-bit shift to the right) is used as a smaller value. Note that if this value is negative due to a quantization error or through γconversion, the value is rounded to 0. On the other hand, a greater value is calculated by subtracting the smaller value from this converted density. Note that if this value exceeds the upper limit of the PWM conversion unit 105 in a later stage due to a quantization error or through γ conversion, the value is rounded to the upper limit value. In the above example, 128 is the value obtained by subtracting a difference value 128 from 256, which is an output value of the pixel selection unit 108 (which is the output in the first embodiment being shifted to the left by 1-bit), and is reduced by ½ (1-bit shift to the right), and a smaller value 64 is obtained. Next, the smaller value 64 is subtracted from 256, which is the output value of the pixel selection unit 108, and a greater value 192 is obtained. The values of input pixels are reconstructed by performing such operations.

On the other hand, it is also possible to perform edge emphasis by converting this difference value. For example, if the above operation is performed after the difference value is doubled (shifted to the left), since the difference value to be inputted in this example is 128, this is doubled (shifted to the left) so that the difference value is increased to 256, and this operation is performed. A value 0 obtained by subtracting the converted difference value 256 from the output value 256 of the pixel selection unit 108 is reduced by ½, and a smaller value 0 is obtained. Next, the above-mentioned smaller value 0 is subtracted from 256, which is the output value of the pixel selection unit 108, so as to obtain a greater value 256; however, since 256 exceeds the upper limit value 255 of the input value for PWM, the value is rounded to 255 and outputted. As a result, as shown in the lower diagram in FIG. 12, for two pixels after edge computation, the upper pixel value is 255, and the lower pixel value is 0.

Note that when converting a difference value, the method is not limited to the above example, and conversion may be performed through other computations, or the difference value may be converted using a table so as to obtain values. If conversion is performed using a table, since nonlinear processing can be easily performed, higher image quality can be achieved.

Further, if the upper and lower pixel values are different values in the pixel selection unit 108, a difference value may be subtracted from a smaller value, and the difference value may be added to a greater value. In this case, although the value is set to 0 if the result obtained by subtracting the difference value from the smaller value is negative, and the value is rounded to the upper limit value if the result obtained by adding the difference value to the greater value exceeds the upper limit value for PWM, since the difference value is used as it is, the difference value after computation will be greater than or equal to the original difference value. In other words, an edge is emphasized.

The edge computing unit 106 outputs pixel values to the PWM conversion unit 105 after edge computation has ended. The PWM conversion unit 105 is the same as that in the first embodiment. Note that since the configuration in a case in which a difference value does not exceed a threshold value in the image analysis unit 100 is the same as that in the first embodiment, a description thereof is omitted.

According to the present embodiment as described above, since an inputted difference value can be reconstructed through edge computation processing, a table having PWM values corresponding to each difference value is not needed. Further, by converting the inputted difference value, it is possible to perform edge emphasis, and still higher image quality can be achieved. Further, by subtracting a difference value from a smaller value, and adding a difference value to a greater value in the pixel selection unit 108, a difference greater than or equal to the inputted difference value can be held, and edges are sharpened.

Fifth Embodiment

Figure 13:
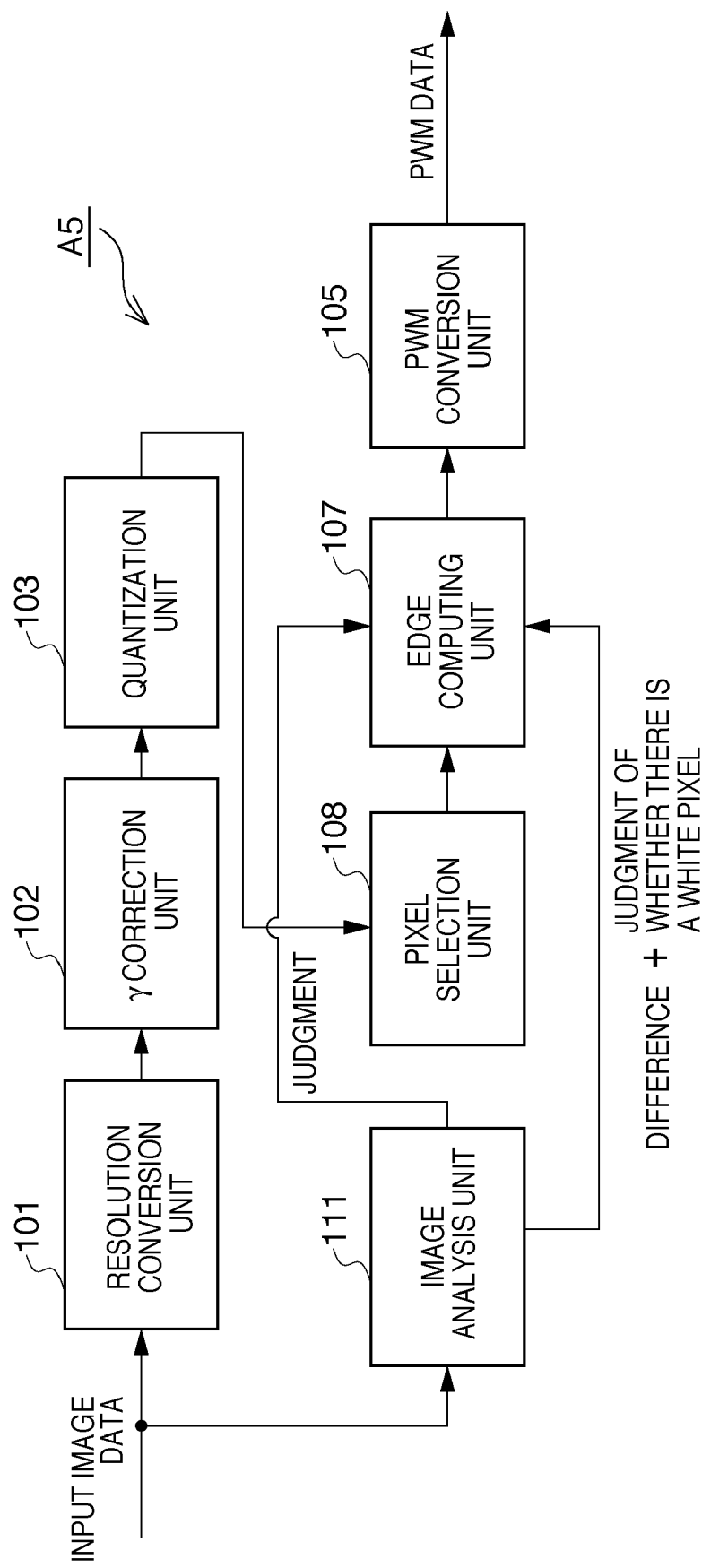
FIG. 13 is a block diagram showing the functional configuration of an image forming apparatus A5 according to a fifth embodiment.

FIG. 13 is a block diagram showing the functional configuration of an image forming apparatus A5 according to a fifth embodiment. Note that an image inputted into an image analysis unit 111 is assumed to be a CMYK color image, the number of levels L of each color is set to 256, output image data is assumed to have the same resolution as that of the original image data, and the number M of error diffusion output levels is set to 9. Further, n indicating the number of pixels that are contiguous in the sub-scanning direction is set to 2.

The image forming apparatus A5 has a configuration in which an edge computing unit 107 is added to the image forming apparatus A1 in the first embodiment. Further, the image forming apparatus A5 outputs to the edge computing unit 107, a determination of a difference value in the sub-scanning direction, a 2-bit determination signal that indicates the size relationship between pixel values, and a signal that indicates whether or not the smaller pixel value of the two pixels is 0, from the image analysis unit 111 according to the timing described in the first embodiment. A 2-bit determination signal is the same as that in the first embodiment. Note that the same flowchart as that in the fourth embodiment is used.

Furthermore, the image analysis unit 111 performs third determination processing for determining whether each pixel value of n input pixels is less than or equal to a second threshold value set in advance. Specifically, whether there is a white pixel among input pixels is detected. Although here, a pixel is determined as a white pixel if each pixel value of the input pixels is less than or equal to the second threshold value, if the pixel value (density value) of an input pixel is 0, a pixel may be determined as a white pixel.

The edge computing unit 107 functions as a determination unit, and based on the determination result of third determination processing, adds the output pixel value of a pixel determined as having a value that is less than or equal to the second threshold value (white pixel) to the output pixel value of a pixel determined as having a value that exceeds the second threshold value (a pixel other than a white pixel). Further, the edge computing unit 107 changes the output pixel value of the pixel determined as having a value that is less than or equal to the second threshold value (white pixel) to 0.

Figure 14:
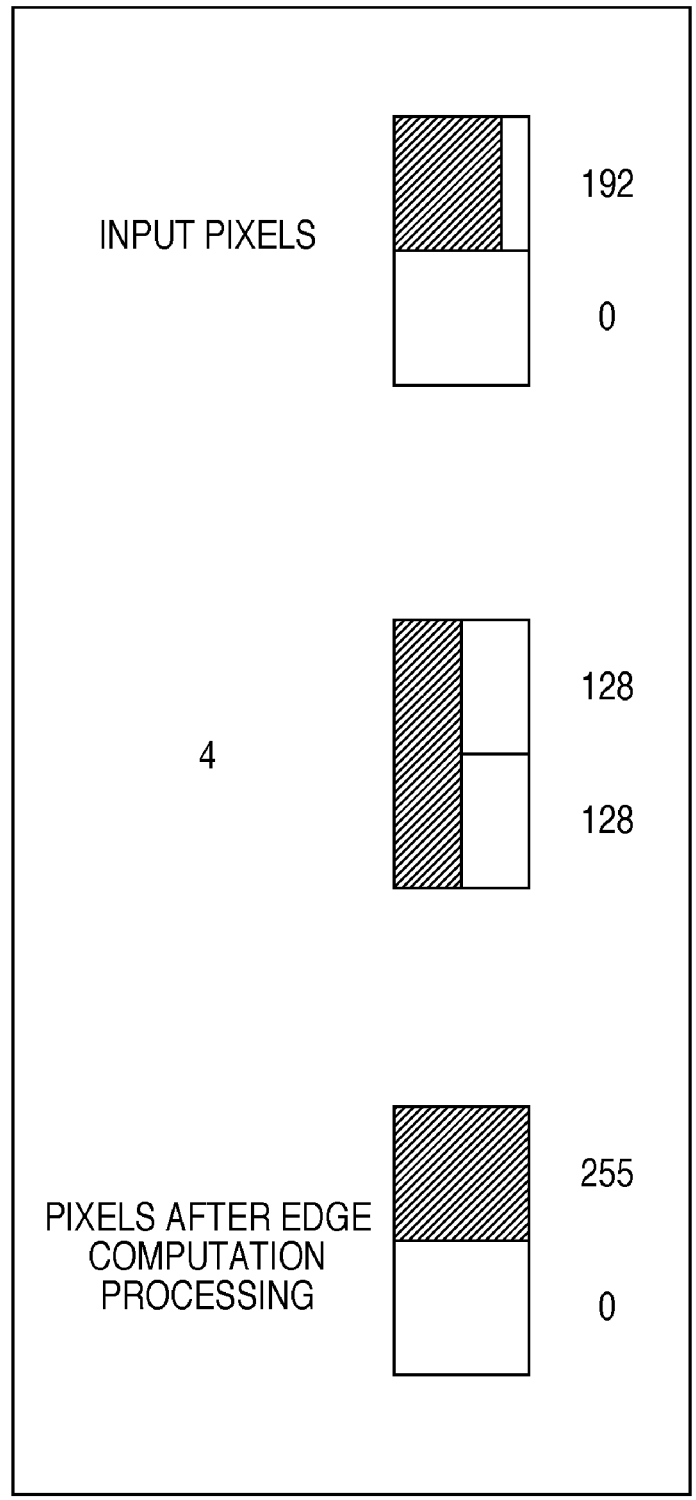
FIG. 14 is a diagram showing pixels inputted into an image analysis unit 111, pixels that the pixel selection unit 108 selected based on a value from the quantization unit 103, and pixels after edge computation processing.

In FIG. 14, the upper diagram shows pixels inputted into the image analysis unit 111, the middle diagram shows pixels selected by the pixel selection unit 108 based on a value from the quantization unit 103, and the lower diagram shows pixels after edge computation processing. The operational procedure for the image forming apparatus A5 is described with reference to FIGS. 11 and 14. The operation of the image analysis unit 111 differs from the fourth embodiment in 2-bit data, and 1-bit data indicating whether or not the value of a smaller pixel value of the two pixels is 0 being outputted to the edge computing unit 107 according to the timing described in the first embodiment. Note that in 1-bit data, 1 is set if the pixel value 0 exists, and 0 is set if the pixel value 0 does not exist. A description is given assuming a case, for example, in which a threshold value for the image analysis unit 111 determining whether or not a pixel is an edge is 100, and as shown in the upper diagram in FIG. 14, an upper pixel value is 192, and a lower pixel value is 0, which are inputted into the image analysis unit 111. In the above example, the difference value between the upper pixel value and the lower pixel value is 192, and the value of a smaller pixel value is 0. Since the threshold value with which the image analysis unit 111 determines whether a pixel is an edge is 100, the image analysis unit 111 determines that the difference is greater than the threshold value, the upper pixel value is greater than the lower pixel value, and the lower pixel value is 0. Therefore, the image analysis unit 111 sets the second bit of a 2-bit determination signal to 1 (greater than the threshold value), and sets the first bit thereof to 1 (the upper pixel value is greater). Further, the 1-bit data indicating whether or not a pixel value 0 exists among the two pixels is set to 1, and is outputted to the edge computing unit 107 according to a similar timing to that in the fourth embodiment.

Also, each processing performed by the resolution conversion unit 101, the γ correction unit 102, the quantization unit 103, the pixel selection unit 108, and the PWM conversion unit 105 (steps S2 to S5, and step S8) is the same as that in the fourth embodiment, and thus, a description thereof is omitted.

As shown in step S6 (see FIG. 11), the edge computing unit 107 determines whether or not a pixel is an edge based on a 2-bit determination signal. In the above case, since the second bit of 2-bit data (a bit that indicates the existence of an edge) is 1, edge computation processing is performed as shown in step S7.

Edge computation processing is described with reference to FIGS. 13 and 14. The middle diagram in FIG. 14 shows pixels outputted from the pixel selection unit 108, and in this example, the upper pixel value is 128, and the lower pixel value is 128. The edge computing unit 107 shown in FIG. 13 performs edge computation using pixels from the pixel selection unit 108, a 2-bit determination signal (the second bit is 1, and the first bit is 1) from the image analysis unit 111, and a 1-bit white pixel determination signal that indicates whether or not a pixel value 0 (white pixel) exists. Specifically, if a 1-bit white pixel determination signal is 1, or in other words, if a pixel value 0 exists, the following processing is added to edge computation processing in the fourth embodiment.

(1) Add a smaller pixel value indicated in a 2-bit determination signal to a greater pixel value, and newly output the resultant value as a greater pixel value. At this time, if the addition result exceeds the upper limit value of an input value into the PWM conversion unit 105, the resultant value is rounded to this upper limit value.

(2) Set the smaller pixel value indicated in the 2-bit determination signal to 0.

Note that if a 1-bit white pixel determination signal is 0, the same result as that in the fourth embodiment is obtained. In the example shown in the middle diagram in FIG. 14, as for the output of the pixel selection unit 108, the upper pixel value is 128 and a lower pixel value is 128, and the analysis result obtained by the image analysis unit 111 indicates that the upper pixel value is greater, and a pixel value 0 exists. Therefore, as shown in the lower diagram in FIG. 14, the lower pixel value is added to the upper pixel value, and the lower pixel value is set to 0. In other words, since the lower pixel value is 128 in the middle diagram in FIG. 14, and the pixel value in the lower diagram in FIG. 14 is 0, 128 is added to the upper pixel value 128, and as shown in the lower diagram in FIG. 14, the upper pixel value is set to 255. The edge computing unit 107 outputs a pixel value to the PWM conversion unit 105 after edge computation has ended. However, if the upper limit value of input into the PWM conversion unit 105 is 255, the upper limit value of a pixel value after edge computation is set to 255.

The processing performed by the PWM conversion unit 105 (step S6) is the same as that in the first embodiment. Note that if the difference does not exceed a threshold value in the image analysis unit 111, the result is the same as that in the first embodiment.

According to the present embodiment as described above, since an output value of a portion in which an input pixel value is 0 is to be 0, a portion having a white pixel is accurately reproduced. Accordingly, when outputting an original whose ground is white such as a document image, resolution does not deteriorate, and a stable output can be obtained.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001105, filed Jan. 6, 2009, which is hereby incorporated by reference herein in its entirety.

What is claimed is:

1. An image forming apparatus comprising:
an integration unit configured to integrate n pixels (n being a natural number that satisfies $2 \leq n$) that include an input pixel of interest in inputted image data and that are contiguous in a sub-scanning direction, and to determine an average value of pixel values of the n pixels as a pixel value of integrated pixels;

a quantization unit configured to quantize the pixel value of the integrated pixels obtained by the integration unit to N levels (N being a natural number that satisfies $3 \leq N$);

an image analysis unit configured to perform first processing for determining whether a difference between the pixel values of n input pixels that are contiguous in the sub-scanning direction exceeds a threshold value set in advance, and second processing for determining whether a direction in which the pixel values of the n input pixels becomes greater is a forward direction of the sub-scanning direction or an opposite direction to the forward direction, and to output results of the first and second processing operations; and a determination unit configured to determine n output pixels in the sub-scanning direction, based on the results of the first and the second processing operations performed by the image analysis unit, from a quantization result of the integrated pixels obtained by the quantization unit.

2. The image forming apparatus according to claim 1, wherein in a case in which the result of the first processing operation performed by the image analysis unit indicates that the difference of the pixel values of the n input pixels is less than or equal to the threshold value set in advance, the determination unit determines a pixel value of the pixel of interest obtained by the quantization unit as a pixel value of each of the n output pixels, and in a case in which the result of the first processing operation performed by the image analysis unit indicates that the difference between the pixel values of the n input pixels exceeds the threshold value set in advance, the determination unit determines a pixel value of each of the n output pixels according to a direction indicated in the result of the second processing.

3. The image forming apparatus according to claim 2, wherein the image analysis unit further outputs the difference between the pixel values of the n input pixels used in the first processing operation to produce the result of the first processing operation, the determination unit has a table showing a plurality of distribution methods set in advance, and in a case in which the result of the first processing operation performed by the image analysis unit indicates that the difference between the pixel values of the n input pixels exceeds the threshold value set in advance, pixel values of the n output pixels are determined using one table determined according to the difference.

4. The image forming apparatus according to claim 1, wherein the determination unit determines the pixel value quantized by the quantization unit as a pixel value of each of the n output pixels.

5. The image forming apparatus according to claim 1, wherein the determination unit selects a pixel value corresponding to the pixel value quantized by the quantization unit from among pixel values stored in advance.

6. The image forming apparatus according to claim 1, wherein the image analysis unit further performs third processing for determining whether each pixel value of the n input pixels is less than or equal to a second threshold value set in advance, and the determination unit, based on a result of the third processing, adds an output pixel value of a pixel determined as being less than or equal to the second threshold value to an output pixel value of a pixel determined as exceeding the second threshold value, and changes the output pixel value of a pixel determined as being less than or equal to the second threshold value to 0.

7. An image forming method comprising:

an integration step of integrating n pixels (n being a natural number that satisfies $2 \leq n$) that include an input pixel of interest in inputted image data and that are contiguous in a sub-scanning direction, and of determining an average value of pixel values of the n pixels as a pixel value of integrated pixels;

a quantization step of quantizing the pixel value of the integrated pixels obtained in the integration step to N levels (N being a natural number that satisfies $3 \leq N$);

an image analysis step of performing first processing for determining whether a difference between the pixel values of n input pixels that are contiguous in the sub-scanning direction exceeds a threshold value set in advance, and second processing for determining whether a direction in which the pixel values of the n input pixels becomes greater is a forward direction of the sub-scanning direction or an opposite direction to the forward direction, and of outputting results of the first and second processing operations; and a determination step of determining n output pixels in the sub-scanning direction, based on the results of the first and the second processing operations performed by the image analysis unit, from a quantization result of the integrated pixels obtained in the quantization step.

8. A program, stored in a non-transitory computer readable storage medium, for causing a computer to function as each unit of the image forming apparatus according to claim 1.

* * * * *